United States Patent [19]
Yamaji et al.

[11] Patent Number: 5,660,924
[45] Date of Patent: Aug. 26, 1997

[54] VACUUM HEAT INSULATOR

[75] Inventors: Tadao Yamaji; Masayoshi Aoki; Hiroshi Yamasaki; Shigeru Tanaka; Masahisa Ochi, all of Amagasaki, Japan

[73] Assignee: Kubota Corporation, Japan

[21] Appl. No.: 414,764

[22] Filed: Mar. 31, 1995

[30] Foreign Application Priority Data

Apr. 12, 1994 [JP] Japan ..................... 6-099310

[51] Int. Cl.$^6$ .......................... B32B 5/06
[52] U.S. Cl. ............. 442/378; 428/307.7; 428/308.8; 428/311.1; 428/312.4; 428/325; 52/404.1; 52/407.1; 52/408; 52/409; 252/62; 106/672
[58] Field of Search ............... 52/404.1, 407.1, 52/408, 409; 252/62; 106/672; 428/297, 292, 293, 304.4, 307.7, 308.8, 311.1, 312.4, 325

[56] References Cited

FOREIGN PATENT DOCUMENTS

| 9146993 | 8/1984 | Japan . |
|---|---|---|
| 60-8399 | 3/1985 | Japan . |
| 5-87292 | 4/1993 | Japan . |
| 578292 | 4/1993 | Japan . |
| 5209700 | 8/1993 | Japan . |
| 6305498 | 11/1994 | Japan . |

*Primary Examiner*—Merrick Dixon
*Attorney, Agent, or Firm*—D. Peter Hochberg; Mark Kusner

[57] ABSTRACT

A vacuum heat insulator is provided which includes a vacuum heat-insulated space defined between a pair of spaced outer skin members, a portion of the space closer to one of the outer skin members being set as high-temperature side, with a portion closer to the other outer skin member being set as low-temperature side. A laminate is disposed at the high-temperature side of the vacuum heat-insulated space, and a board having an inorganic material is disposed at the low temperature side. The laminate includes inorganic sheet members and metallic foils with low heat emissivity, the sheet members and metallic foils being alternately laid in plural layers.

5 Claims, 3 Drawing Sheets

3

VACUUM HEAT INSULATOR

FIELD OF THE INVENTION

The present invention relates to a vacuum heat insulator and, more particularly, to a vacuum heat insulator comprised of an inorganic fiber board or inorganic fiber sheets as an heat insulating material.

BACKGROUND OF THE INVENTION

Heat insulators for use in constructing, for example, walls of a heat treating baking oven which require a high degree of heat insulation are known, as described in, for example, Japanese Patent Publication No. 60-8399 which teaches a heat insulator comprising a pair of spaced outer skin materials having an enclosed space defined therebetween, with an inorganic foamed powder material packed highly densely within the enclosed space, the interior of the enclosed space being vacuumized.

Heat insulators of this type exhibit high heat insulation performance through combined effects of both the vacuum atmosphere present within the space and the thermal insulation effect of the inorganic foamed powder mass or fibers densely packed in the space. With such a heat insulator having, for example, a wall thickness on the order of 4 to 5 cm, heat insulation is possible between ordinary temperature and a temperature having a temperature difference range 0f 300° to 400° C. relative to the ordinary temperature.

However, such a known heat insulator involves a problem that while any heat that will otherwise pass through the thermally insulated space by way of heat conduction can be sufficiently reduced, passage of heat by radiation cannot sufficiently be reduced. From the standpoint of effective heat insulation, therefore, there still exists a room for further improvement.

DISCLOSURE OF THE INVENTION

The object of the present invention is to provide a vacuum heat insulator which retains the same level of insulating performance against heat through thermal conduction as known heat insulators and yet can satisfactorily reduce passage of heat through radiation.

The invention also contemplates the provision of a vacuum heat insulator having high pressure resistance.

In order to accomplish these objects, the vacuum heat insulator in accordance with the invention comprises a pair of outer skin members arranged in spaced relation; a vacuum heat-insulated space defined between the pair of outer skin members, a portion of the space closer to one of the outer skin members being set as high-temperature side, with a portion closer to the other outer skin member being set as low-temperature side; a laminate disposed at the high-temperature side of the vacuum heat-insulated space; and a board formed of an inorganic material and disposed at the low-temperature side of the vacuum heat-insulated space; the laminate including inorganic sheet members and metallic foils with low heat emissivity, the sheet members and metallic foils being alternately laid in plural layers.

According to such arrangement, the metallic foils having low heat emissivity, which are constituent members of the laminate, can restrain the transfer of heat to the low temperature side of the vacuum heat insulator due to heat radiation to a very low level, so that general heat insulation effect of the vacuum heat insulator can be enhanced.

According to the invention, the laminate and the board may be densely compressed in the thicknesswise direction of the vacuum heat insulator to a density that can withstand a pressure corresponding to an atmospheric pressure against the vacuum. This makes it possible to obtain a vacuum heat insulator having high pressure resistance so that compressive deformation under atmospheric pressure can be minimized to a great extent, irrespective of the form of the insulator, a rectangular vessel or a plate, for example.

According to the invention, the metallic foils of the laminate may be each formed with a multiplicity of through-holes. Through this arrangement, when a vacuum is drawn, the air or gas present in the inorganic sheet between adjacent metallic foils can be more smoothly evacuated, whereby improved vacuum effect can be obtained. In this conjunction, adjacent metallic foils laid thicknesswise of the laminate may be arranged to have their through-holes bored in staggered relation so that no through-hole is overlapping another through-holes. By so doing it is possible to prevent any unintended drop in the effect of heat reflection from the metallic foils. Thus, it is possible to restrain transmission of heat due to radiation to ensure satisfactory heat insulation despite the presence of through-holes.

Further, according to the present invention, a method of fabricating a vacuum heat insulator is provided which comprises impregnating a mat formed of inorganic fibers with a binder, then compressing the mat into a form of a board to a density that can withstand a pressure corresponding to an atmospheric pressure against a vacuum, thereby hardening the same; placing the hardened mat and the laminate in a space between a pair of outer skin members; heating the interior of the space to a decomposition temperature of the binder to gasify the binder while discharging the gas from the space, and evacuating the interior of the space to a vacuum. In this way,it is possible to easily fabricate a vacuum heat insulator having such high heat insulation performance and yet such high pressure resistance as described above.

The inorganic sheet members, which are laminated with metallic foils to form a laminate, are likewise compressed and hardened by using a binder and may further be subjected to heat treatment.

For the outer skin members which form the exterior of the vacuum heat insulator, stainless steel sheets may be used for example.

For the inorganic sheet members as a constituent material of the laminate and also for the board comprised of an inorganic material, sheets made of inorganic fiber materials such as glass wool, ceramic wool or rock wool may be advantageously used.

For metallic foils having low heat emissivity which are used as a constituent material of the laminate, aluminum or copper foils having a thickness of about 10 µm, for example, maybe advantageously used. Specifically, those having a heat emissivity of not more than 0.05 are suitable for use. The arrangement that inorganic fiber sheet members and metallic foils of low heat emissivity are alternately laid in plural layers is intended to ensure that heat conduction of the laminate body is prevented from increase which is caused by metallic foils arranged to contact each other. Further, in order to enhance the effect of decrease of radiant heat transfer by use of as many metallic foils as possible, it is preferable that the inorganic fiber sheets are thinner.

The board which is made up of an inorganic fiber material is formed in such a way that an inorganic fiber mat previously impregnated with a binder is compressed by a pressing machine or the like to a density that can withstand a pressure corresponding to an atmospheric pressure against a vacuum and is thus hardened. Similarly, inorganic fiber sheet members which are laminated with metallic foils to form a laminate, may be formed by passing through the steps of binder impregnation, compression and hardening. These compressed materials are packed between outer skin members, and the resulting composite is subsequently heated to the gasification/decomposition temperature of the binder. The generated gas is then removed, followed by vacuum evacuation. The process will now be described in detail.

An inorganic fiber mat impregnated with the binder is compressed to a density which can withstand a pressure corresponding to an atmospheric pressure against a vaccuum and to a thickness corresponding to the difference between the thickness of the space between the outer skin members and the thickness of the laminate, whereby the mat is hardened. Also, the inorganic fiber sheet members laminated with metallic foils to form the laminate is impregnated with a binder, and thereafter compressed to a density that can withstand a pressure corresponding to an atmospheric pressure against a vacuum and, in the laminated condition with the metallic foils, to a thickness corresponding to the difference between the thickness of the space between the outer skin members and the thickness of the compressed mat or the board, whereby the inorganic fiber sheet members are hardened.

For the binder to be used for the laminate, any known organic material may be advantageously used. Examples of water-soluble binders useful as such include casein, gelatin, starch, dextrin, water-glass, polyvinyl alcohol, methyl cellulose, ethyl cellulose, carboxymethyl cellulose, and sodium salt. Emulsion type binders suitable for use include, for example, polyvinyl acetate, polyester acrylate, styrene-butadiene rubber, butadiene-acrylonitrile rubber, and neoprene rubber. Solvent type binders suitable for use include, for example, polyurethane, vinyl chloride-vinyl acetate copolymers, linear polyester, and acrylic copolymers. Hot-melt type binders suitable for use, include, for example, ethylene-vinyl acetate copolymers, vinyl acetate, polyamide, polyethylene, rosin ester, hydrogenated rosin, microcrystalline wax, paraffin wax, and carnauba wax. Other useful binders include, for example, polypropylene, nylon, ionomer, ethylene-ester acrylate copolymers.

For the binder to be used for the inorganic fiber board, any known organic materials may be advantageously used, such as phenol resin, furan resin, epoxy resin or urethane resin, with which gasification of the component of the binder is effectuated in the heating process.

Mats for construction of the board which are impregnated with a binder, and also a laminate of binder impregnated members with metallic foils, are respectively compressed separately or simultaneously and hardened by a pressing machine or the like to a thickness that will permit their being packed into a predetermined position between the pair of outer skin members and to a density that can withstand a pressure corresponding to an atmospheric pressure against a vacuum.

Thus, the operation of packing the laminate and the board into the space between the pair of outer skin members is made very easy to perform as it is simplified virtually to the level of inserting thereinto a plate member having a thickness equivalent to the thickness of the space between the outer skin members.

Then, the space interior is heat treated in the air so that the organic binder which is binding the inorganic fibers is decomposed, and as a consequence of this decomposition the binder mass is allowed to fly away in the form of a gas, interfiber binding being thus eliminated.

In this case, since the space between the pair of outer skin members is substantially in enclosed state, thermal decomposition of the binder may take time and, in addition, there may be a need for removal of oxides depositing on the outer skin members. Therefore, it may be desirable to positively supply oxygen or air into the space to accelerate oxidation of the binder so as to complete the process within a short time period. Such positive supply of oxygen or air can be accomplished by compressed air injection or mere oxygen supply.

In this way, by causing the binder to be decomposed for outward dispersion, the plate members which are formed of an inorganic fiber material are allowed to be restored and expanded to a slight extent. Thereafter, the space between the outer skin members is evacuated and vacuumized, whereby the outer skin members are supported by the restoring force of the inorganic plate members inserted in position after being compressed in a way that the distance between the outer skin members becomes the same as the original one, and thus the outer skin members are protected from any depressed deformation being caused to their surfaces by atmospheric pressure.

Organic binders, when thermally decomposed, are gasified for dispersion into the air, thereby preventing increase of the heat conduction of the binders and vacuum deterioration caused by the outgas after evacuation.

The binder may be mixed with an anti-radiation agent and/or heat-scattering agent. By so doing it is possible to allow the anti-radiation agent or heat scattering agent to be retained in both sheet members and board of the laminate during the stage of binder gasification, so that such agent is held in a uniformly dispersed condition. This enables further decrease of radiant heat transfer of the inorganic fiber material as well as further improvement of heat insulating efficiency of the heat insulator.

It is also possible to arrange the pressure-resistant inorganic fiber board alone in the space between the outer skin members. In this case, the heat insulating efficiency is poorer than in the case where the laminate is used. However, a vacuum heat insulator having excellent pressure resistance can be obtained at a low cost. Moreover, the laminate having good pressure resistance can be arranged alone in the space between the outer skin members. In this case, a vacuum heat insulator having good pressure resistance and extremely high heat insulating efficiency can be obtained but at a high cost.

DESCRIPTION OF THE EMBODIMENTS

EXAMPLE 1

Figure 1:
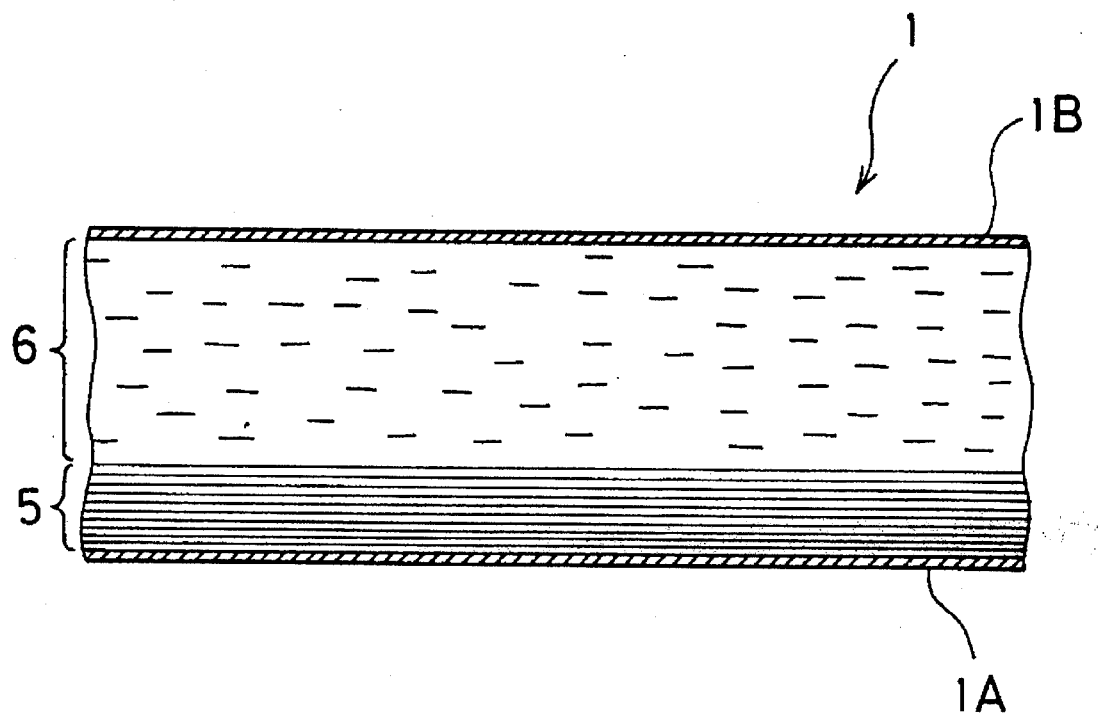
FIG. 1 is a fragmentary sectional view of a vacuum heat insulator representing one embodiment of the present invention.

As FIG. 1 illustrates, a vacuum heat insulator 1 was constructed which comprised an internal space having a thickness of 25 mm, and outer skin members 1A and 1B each formed of a stainless steel sheet having a thickness of 0.2 mm. The outer skin members 1A, 1B were arranged so that the one skin member 1A was disposed at the high-temperature side and the other 1B at the low-temperature side, with a laminate 5 disposed in a portion of the vacuum heat insulator 1 which is located close to the high-temperature side outer skin member 1A. The interior of the vacuum heat insulator 1 between the laminate 5 and the low-temperature side outer skin member 1B was filled with a rock wool board 6 having a thickness of 17.8 mm and a density of 430 kg/m$^3$ which was impregnated with a phenolic resin binder and compressed to a density that can withstand a pressure corresponding to an atmospheric pressure against the vacuum.

Figure 2:
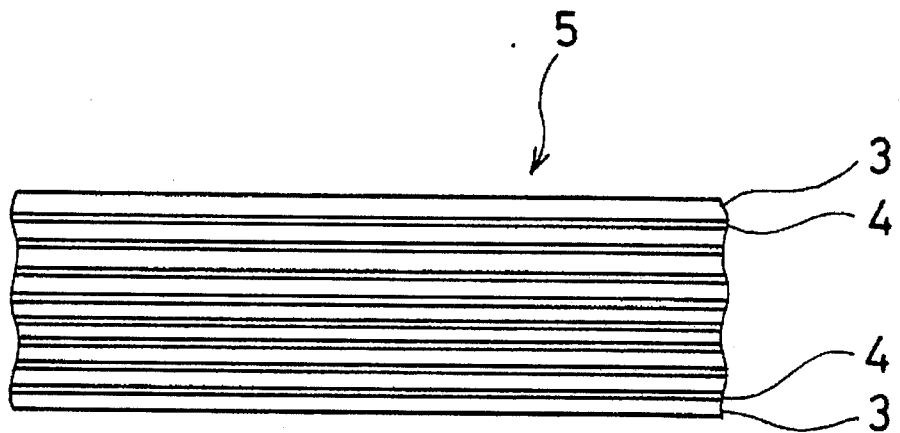
FIG. 2 is a view showing a laminate in FIG. 1 on an enlarged scale.

The laminate 5, as shown in FIG. 2, comprised inorganic fiber sheets 3 and metallic foils 4 which are alternately laid in plural layers. In particular, for the inorganic fiber sheets 3 were used glass wool sheets, 0.5 mm thick, comprised of class E glass fibers (of 9 μm in fiber diameter), and for the metallic foils 4 were used 10 μm thick aluminum foils. The aluminum foils were each uniformly coated on both sides with a polyethylene binder to a thickness of 30 μm, and inorganic fiber sheets 3, 30 in number, and metallic foils 4, 29 in number, were alternately placed in layers so that an inorganic fiber sheet 3 came outermost (FIG. 2 depicts such laminated layers in a simplified form). Prior to the stage of pressing, the laminate or layer stack 5 had a thickness of 15.2 mm. Then, the layer stack 5 was compressed thicknesswise by a flat pressing machine to a thickness of 7.2 mm, whereby the binder was hardened.

The resulting heat insulator 1 was placed in a heating oven and heated to a temperature of not lower than the decomposition temperature of the binder in an air atmosphere, so that the binder was oxidized and gasified. Subsequently, the interior space of the heat insulator 1 was vacuum-evacuated to provide a vacuum heat-insulated space, whereby a finished product was obtained.

With the vacuum heat insulator 1 thus obtained, measurements were made as to heat conductivity and post-vacuum evacuation surface deformation on the condition that the temperature at the high temperature side of the insulator is 400° C. and that at the low temperature side is 20° C. The measurement results are shown in Table 1.

In Table 1, values for surface deformation after vacuum evacuation which represent the results of pressure resistance tests are shown in terms of surface depression deformation measurements at a center portion of the flat panel-form vacuum heat insulator after vacuum evacuation. Heat conductivity measurements were made by means of a thermal conductivity measuring instrument constructed in accordance with JIS A 1412, "Heat Flow Measurement Method".

In Table 1, the term "Vacuumization Process Time" means time required after heat insulator 1 is placed in a heating oven for binder oxidization and gasification and until a target degree of vacuum (0.01 Torr) has been reached.

EXAMPLE 2

Figure 3:
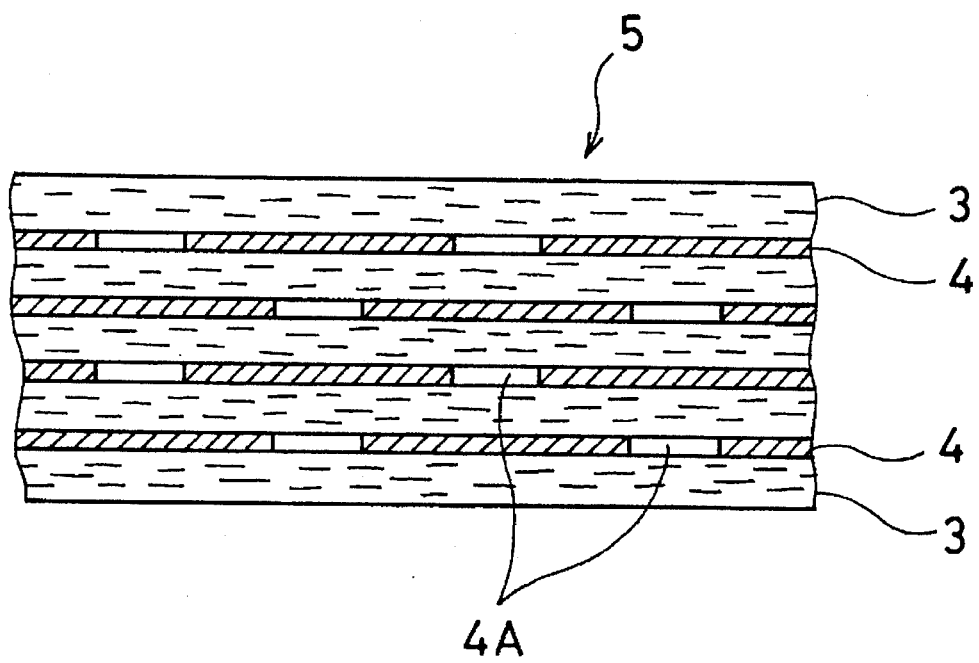
FIG. 3 is an enlarged sectional view of a laminate in another embodiment of the invention.

A laminate 5 as illustrated in FIG. 3 was used which comprised aluminum foils 4 with a multiplicity of through-holes 4A bored in each foil. During the stage of layer stacking, it was arranged that adjacent metallic foils 4 laid thicknesswise of the laminate had their through-holes bored in staggered relation so that no through-hole was overlapping another through-holes. In other respects, the same procedure as used in Example 1 was followed to obtain a heat insulator 1.

Comparative Example

Figure 4:
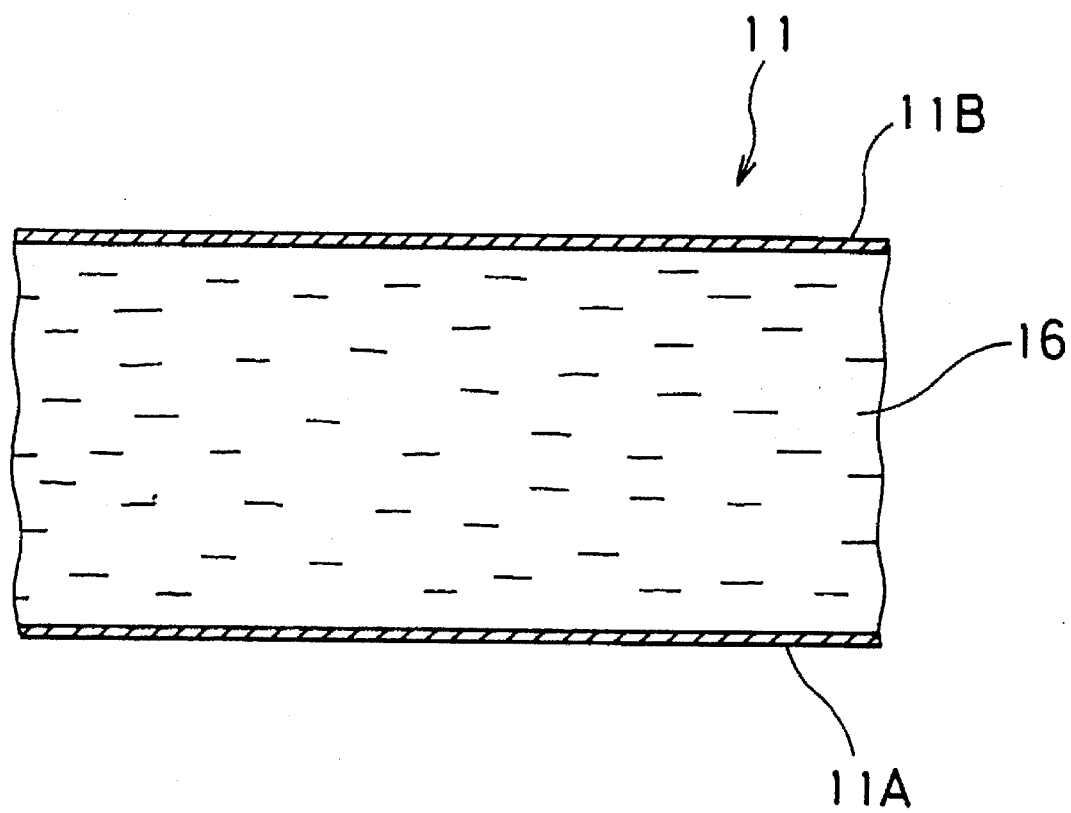
FIG. 4 is a fragmentary sectional view of a vacuum heat insulator in a comparative example.

As FIG. 4 illustrates, the spacing between outer skin members 11A and 11B was set at 25 mm. The interior portion between these outer skin members 11A, 11B was filled with a 25 mm thick rock wool board 16 as impregnated with a binder and compressed to a density that can withstand a pressure corresponding to an atmospheric pressure against the vacuum. No laminate was packed. In other respects, the same procedure as used in Example 1 was followed and a similar heating process was carried out for binder gasification and removal. Thus, a vacuum heat insulator 11 was obtained.

In the same way as in Example 1, measurements were made with Example 2 and Comparative Example. The results of the measurements are also shown in Table 1.

TABLE 1

|  | Pressure Resistance (mm) | Heat Conductivity (W/mK) | Vacuumization Time (hrs) |
| --- | --- | --- | --- |
| Example 1 | 1.5 | 0.0035 | 2.0 |
| Example 2 | 1.5 | 0.0038 | 1.5 |
| Comp. Ex. | 1.5 | 0.0075 | 1.5 |

As is apparent from Table 1, vacuum heat insulators of Examples 1 and 2 were found as having far much greater heat insulating properties as compared with the vacuum heat insulator of Comparative Example. In Example 2, some reduction was achieved in vacuum process time or the time required for heat insulator fabrication. The vacuum heat insulator of Example 2 has no adverse effect from the view point of product utility, though the heat insulator obtained was slightly lower in heat insulating performance than the heat insulator of Example 1.

What is claimed is:

1. A vacuum heat insulator comprising:

a pair of outer skin members arranged in spaced relation, a vacuum heat-insulated space defined between the pair of outer skin members, a portion of the space closer to one of the outer skin members being set as high-temperature side, with a portion closer to the other outer skin member being set as low-temperature side, a laminate disposed at the high-temperature side of the vacuum heat-insulated space, and a board formed of an inorganic material and disposed at the low-temperature side of the vacuum heat-insulated space, said laminate including inorganic sheet members and metallic foils with low heat emissivity, the sheet members and metallic foils being alternately laid in plural layers, said metallic foils restraining the transfer of heat to the low-temperature side due to heat radiation.

2. A vacuum heat insulator as set forth in claim 1, wherein the laminate is densely compressed in the thicknesswise direction of the vacuum heat insulator to a density that can withstand a pressure corresponding to an atmospheric pressure in relation to a vacuum.

3. A vacuum heat insulator as set forth in claim 1, wherein the metallic foils of the laminate are each formed with a multiplicity of through-holes, adjacent metallic foils laid thicknesswise of the laminate having their through-holes bored in staggered relation so that no through-hole is overlapping another through-hole.

4. A vacuum heat insulator as set forth in claim 1, wherein the board and the sheet members are all formed of inorganic fibers.

5. A vacuum heat insulator as set forth in claim 1, wherein the board is compressed in the thicknesswise direction of the vacuum heat insulator to a density that can withstand a pressure corresponding to an atmospheric pressure in relation to a vacuum.

* * * * *